US005876817A

United States Patent [19]

Mathna et al.

[11] Patent Number: 5,876,817

[45] Date of Patent: Mar. 2, 1999

[54] ADHESIVE CLIP

[75] Inventors: Charles A. Mathna, St. Paul; Mark E. Reeves, Mahtomedi, both of Minn.

[73] Assignee: Minnesota Mining and Manufacturing Company, St. Paul, Minn.

[21] Appl. No.: 741,505

[22] Filed: Oct. 31, 1996

[51] Int. Cl.[6] .......... B32B 7/12

[52] U.S. Cl. .......... 428/40.1; 40/134; 40/391; 40/768; 40/769; 428/41.7; 428/41.8; 428/41.9; 428/42.1; 428/422; 428/202; 428/203; 428/220; 428/354

[58] Field of Search .......... 428/40.1, 41.7, 428/41.8, 41.9, 42.1, 42.2, 354, 202, 203, 220; 40/768, 769, 391, 134

[56] References Cited

U.S. PATENT DOCUMENTS

| | | | |
|---|---|---|---|
| 3,620,891 | 11/1971 | Jones | 428/42.2 |
| 3,691,140 | 9/1972 | Silver | 260/78.5 |
| 3,857,731 | 12/1974 | Merrill, Jr. et al. | 117/122 |
| 4,166,152 | 8/1979 | Baker et al. | 428/522 |
| 4,400,899 | 8/1983 | Martinez | 40/391 |
| 4,842,303 | 6/1989 | Molenda | 428/42.1 |
| 4,950,517 | 8/1990 | Loggins | 428/41.9 |
| 5,196,246 | 3/1993 | Kauss et al. | 428/39 |
| 5,198,301 | 3/1993 | Hager et al. | 428/355 |
| 5,495,644 | 3/1996 | Mesher et al. | 24/3.12 |
| 5,498,455 | 3/1996 | Roberts | 428/41.6 |
| 5,569,503 | 10/1996 | Piotroski | 428/41.8 |

FOREIGN PATENT DOCUMENTS

| | | |
|---|---|---|
| 0 266 454 | 5/1988 | European Pat. Off. . |
| 2100392 | 3/1972 | France . |
| 2518458 | 6/1983 | France . |
| 682855 | 11/1950 | United Kingdom . |

OTHER PUBLICATIONS

International Search Report PCT/US97/03617.

*Primary Examiner*—Nasser Ahmad

*Attorney, Agent, or Firm*—William L. Huebsch; David B. Patchett

[57] ABSTRACT

Described is an adhesive clip including a back sheet with a first layer of removable pressure sensitive adhesive on its front major surface, and a second layer of removable pressure sensitive adhesive on its rear surface; and a front sheet of polymeric material having a size adapted to at least overlay the first layer of removable pressure sensitive adhesive on the back sheet which has a first edge attached to the back sheet with the front sheet overlying the first layer of removable pressure sensitive adhesive. When the back sheet is adhered to a planar substrate by the second layer of pressure sensitive adhesive, the front sheet can be pivoted away from the back sheet a distance affording positioning an edge portion of a sheet to be supported between the front sheet and the first layer of pressure sensitive adhesive and pressing of that portion of the sheet to be supported into engagement with the first layer of pressure sensitive adhesive so that the sheet will be supported along the substrate. Subsequently, the front sheet can be moved away from that supported sheet which can then be pealed away from the first layer of pressure sensitive adhesive and removed from the clip, after which the front sheet will protect the adhesive of the front of the back sheet until another sheet or other light object is adhered to it.

8 Claims, 3 Drawing Sheets

ADHESIVE CLIP

FIELD OF THE INVENTION

The present invention relates to sheets having opposite major surfaces coated with removable pressure sensitive adhesive that are adapted to have the adhesive on one major surface adhered to a vertical surface and to have a sheet or other light weight item adhered to the adhesive coating on its other major surface to support it along that vertical surface.

BACKGROUND OF THE INVENTION

Sheets are known that have a polymeric backing and opposite major surfaces both coated with removable pressure sensitive adhesive, which sheets are adapted to have the adhesive on one major surface adhered to a vertical surface and to have a sheet or other light weight item removeably adhered to the adhesive coating on its other major surface to support it along that vertical surface. Wallsaver (t.m.) Removable poster tape available from Minnesota Mining and Manufacturing Company, St. Paul, Minn. is an illustrative example. When a strip of such tape is adhered to a vertical surface and then used to support a series of sheets, one at a time, along that vertical surface, however, the adhesive is exposed between having sheets adhered to it and can become contaminated so that it is less effective.

DISCLOSURE OF THE INVENTION

The present invention provides an adhesive clip incorporating a back sheet having opposite major surfaces coated with removable pressure sensitive adhesive and adapted to have the adhesive on one major surface adhered to a vertical surface and to have a sheet or other light weight item removeably adhered to the adhesive coating on its other major surface to support it along that vertical surface, which adhesive clip provides protection for the adhesive between a series of uses of the clip for that purpose, and also locates the sheet to be supported with respect to an upper edge of the clip.

Generally, the adhesive clip according to the present invention comprises the back sheet with a first layer of removable pressure sensitive adhesive on its front major surface, and a second layer of removable pressure sensitive adhesive on its rear surface; a front sheet of polymeric material having a size adapted to at least overlay the first layer of removable pressure sensitive adhesive on the back sheet (which front sheet is preferably, but not necessarily, visually transparent); and means for attaching a first edge of the front sheet to the back sheet with the front sheet overlying the first layer of removable pressure sensitive adhesive on the front surface. When the back sheet is adhered to a planar substrate by the second layer of pressure sensitive adhesive, the front sheet can be pivoted away from the back sheet a distance affording positioning an edge portion of a sheet to be supported between the front sheet and the first layer of pressure sensitive adhesive. That portion of the sheet to be supported can be pressed into engagement with the first layer of pressure sensitive adhesive so that the sheet will be supported along the substrate. Subsequently, the front sheet can be moved away from that supported sheet which can then be pealed away from the first layer of pressure sensitive adhesive and removed from the clip, after which the front sheet will protect the adhesive of the front of the back sheet until another sheet or other light object is adhered to it.

In one embodiment adapted to support only one sheet, the adhesive clip has but one first layer of removable pressure sensitive adhesive on the front surface of the back sheet, and one front sheet overlaying it.

In another embodiment adapted to support a plurality of sheets in shingled relationship, the back sheet of the adhesive clip is elongate, and a plurality of front sheets are attached along the back sheet in spaced relationship with first edges of the front sheets adjacent a first end of the back sheet and with the front sheets each overlying a different one of a plurality of layers of removable pressure sensitive adhesive spaced along the front surface of the back sheet. When the back sheet of this embodiment is adhered to a planar substrate by the second layer of pressure sensitive adhesive, any one of the front sheets can be pivoted away from the back sheet to support or remove a supported sheet as described above, and this embodiment can removably support a plurality of sheets along the substrate in shingled relationship.

In yet another embodiment of the adhesive clip the front sheet or sheets can each have a second layer of removable pressure sensitive adhesive on its surfaces adjacent the back sheet. This second layer of removable pressure sensitive adhesive is particularly useful when the adhesive clip is used to support a document such as a calendar which includes a plurality of sheets bound along one edge. The adhesive clip can support such a document with its bound edge generally horizontal and with at least two sheets of the document projecting upwardly into the adhesive clip. The adhesive on the front surface of the back sheet and on the surface of the front sheet adjacent the back sheet will adhere to the outer surfaces of the two outermost sheets projecting upwardly into the adhesive clip and hold those two outermost sheets (and any other sheets sandwiched between them) in the clip.

Preferably, the second layer of pressure sensitive adhesive extends over the entire rear surface of the back sheet which is highly flexible and conformable to a surface to which it is adhered, the first layer of removable pressure sensitive is smaller in area than the second layer of pressure sensitive adhesive, and each front sheet is flexible, of stiffer material than the back sheet, and has an end portion projecting past the side of the first layer of removable pressure sensitive adhesive opposite its first edge, which end portion is adapted for manual engagement to pivot the front sheet away from the back sheet.

BRIEF DESCRIPTION OF THE DRAWING

The present invention will be further described with reference to the accompanying drawing wherein like reference numerals refer to like parts in the several views, and wherein.

DETAILED DESCRIPTION OF THE PREFERRED EMBODIMENTS

Figure 1:
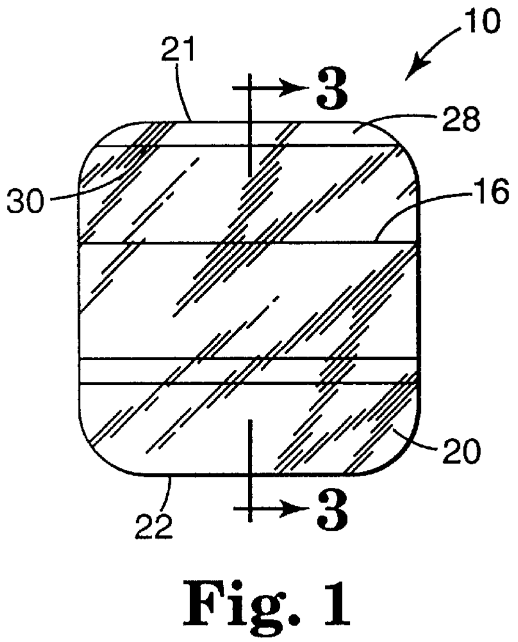
FIG. 1 is a front view of a first embodiment of an adhesive clip according to the present invention.
Figure 2:
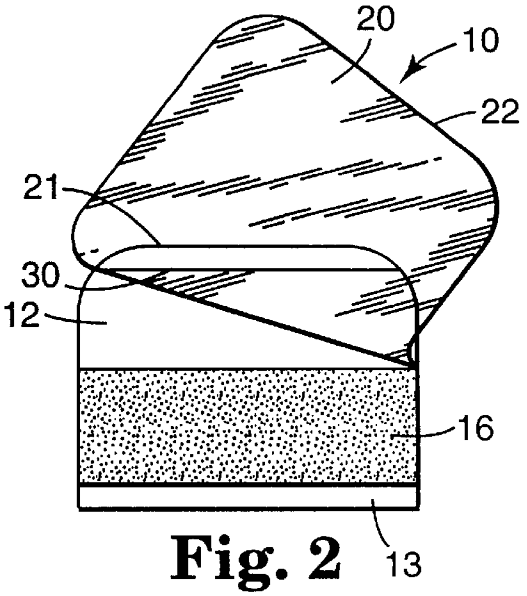
FIG. 2 is a front view of the adhesive clip of FIG. 1 in which a front sheet of the adhesive clip is lifted up to expose a layer of removable pressure sensitive adhesive on a rear sheet of the adhesive clip.

Referring now to FIGS. 1 through 4 of the drawing there is illustrated a first embodiment of an adhesive clip according to the present invention generally designated by the reference numeral 10.

Figure 4:
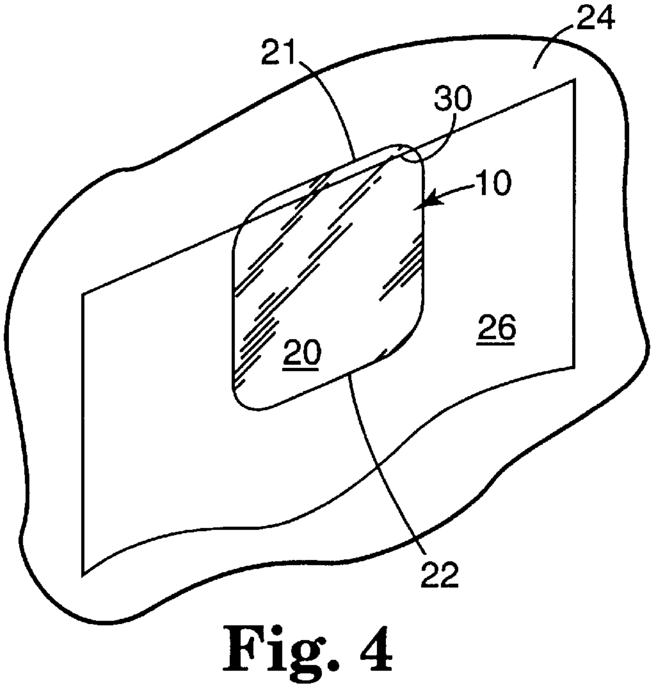
FIG. 4 is a perspective view of the adhesive clip of FIG. 1 supporting a sheet along a vertical substrate.

Generally, the adhesive clip 10 comprises a back sheet 12 having opposite front and rear major surfaces 13 and 14; a first layer 16 of removable pressure sensitive adhesive on its front major surface 13; a second layer 18 of removable pressure sensitive adhesive on the rear surface of the back sheet 12; and a front sheet 20 of visually transparent polymeric material having first and second opposite edges 21 and 22 and having a size adapted to at least overlay the first layer 16 of removable pressure sensitive adhesive on the front surface 13; and means (later to be explained) for attaching the first edge 21 of the front sheet 20 to the back sheet 12 with the front sheet 20 overlying the first layer 16 of removable pressure sensitive adhesive on the back sheet 12. When the back sheet 12 is then adhered to a planar substrate such as a vertical wall 24 as is illustrated in FIG. 4 by the second layer 18 of pressure sensitive adhesive, the front sheet 20 can be pivoted away from the back sheet 12 (see FIG. 2) a distance affording positioning an edge portion of a sheet 26 to be supported between the front sheet 20 and the first layer 16 of pressure sensitive adhesive to afford pressing that portion of the sheet 26 to be supported into engagement with the first layer 16 of pressure sensitive adhesive (which can be done through the front sheet 20) so that the sheet 26 to be supported will be adhered to the adhesive clip 10, while being easily read through the transparent front sheet 20. Subsequently, the front sheet 20 can be moved away from the sheet 26 being supported to afford manually pealing away and removal of that sheet 26 from the first layer 16 of pressure sensitive adhesive and the adhesive clip 10.

As illustrated, the means for attaching the first edge of the front sheet 20 to the back sheet 12 comprises an elongate strip 28 of hinge tape. That elongate strip 28 of hinge tape includes a backing having opposite major surfaces, a layer of pressure sensitive adhesive on both of said major surfaces, and opposite longitudinally extending edges 30. The layer of pressure sensitive adhesive on one of its major surfaces is adhered to the front sheet 20 with one of its longitudinally extending edges 30 along the first edge 21 of the front sheet 20, and the layer of pressure sensitive adhesive on the other of said major surfaces of the elongate strip 28 is adhered to the front surface 13 of the back sheet 12. The edge 30 of the elongate strip 28 adjacent the first layer 16 of removable pressure sensitive adhesive can serve as a straight edge to align the top edge of a sheet to be supported by the adhesive clip when it is inserted into the clip 10.

Both the back sheet 12 and the front sheet 20 are flexible with the front sheet 20 being of stiffer material than the back sheet 12. For example, the back sheet 12 can be a 0.0025 inch thick layer of the supple conformable "Surlyn" brand film available from E. I. DuPont de Nemours Co., Wilmington Del., which is described in U.S. Pat. No. 5,198,301 for use in wall decorations, and the second layer 18 of removable pressure sensitive adhesive on the rear surface of the back sheet 12 can be the same adhesive described in that U.S. Pat. No. 5,198,301, the content whereof describing that film and adhesive is incorporated herein by reference. The front sheet 20 can be a 0.0038 inch thick polyester, which can be transparent, translucent or opaque, and can, if desired, have words written on it. The suppleness and conformability of the back sheet 12 allows the second layer 18 of removable pressure sensitive adhesive to conform to and make intimate contact with the surface of a substrate on which the adhesive clip 10 is adhered. The relatively greater stiffness of the front sheet 20 makes it easier to peel away from the first layer 16 of removable pressure sensitive adhesive than if it were as supple as the back sheet 12. The first layer 16 of removable pressure sensitive adhesive can be any of the known types of that adhesive such as an adhesive including microspheres of the type described in U.S. Pat. No. 3,691,140 in an adhesive construction such as those described in either of U.S. Pat. Nos. 3,857,731 or 4,166,152, the content of which three patents are hereby incorporated herein by reference. The first layer 16 of removable pressure sensitive adhesive can be directly coated on the front surface 13 of the back sheet 12, or could be adhered thereto such as by being coated along one major surface of a film backing layer to the other major surface of which is coated a permanent pressure sensitive adhesive that is adhered to the front surface of the back sheet 12 (e.g., by using the double coated tape commercially available as "Y9415" tape available from Minnesota Mining and Manufacturing Company, St. Paul, Minn.).

Figure 3:
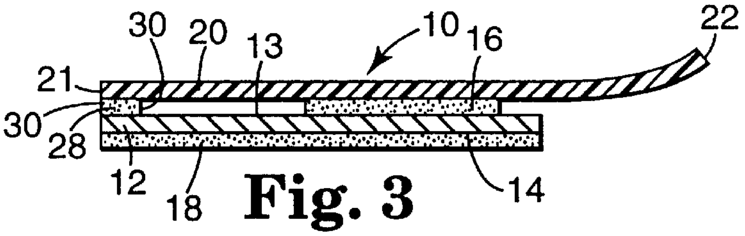
FIG. 3 is a sectional view taken approximately along line 3—3 of FIG. 1 in which the thicknesses of the various sheets and layers are exaggerated to show details.

The front sheet 20 has an end portion adjacent its second edge 22 that projects past the side of said first layer 16 of removable pressure sensitive adhesive opposite its first edge 21 (e.g., projects past by at least one half inch). That end portion is adapted for manual engagement to pivot the front sheet 20 away from the back sheet 12, and as is illustrated in FIG. 3, the front sheet 20 can be bent slightly so that that end portion projects above the portion of the front sheet 20 extending over the first layer 16 of pressure sensitive by about 15 degrees to facilitate grasping it when the adhesive clip 10 is adhered to a substrate.

The second layer 18 of pressure sensitive adhesive extends over the entire rear surface of the back sheet 12, whereas the first layer 16 of removable pressure sensitive adhesive has an area less than the area of the second layer 18 of pressure sensitive adhesive and is in an elongate strip extending parallel to the first edge 21 of the front sheet 20. The edge of the first layer 16 of removable pressure sensitive adhesive opposite the first edge 21 of the front sheet 20 is closer to that first edge 21 than the edge of the second layer 18 of pressure sensitive adhesive opposite that first edge 21 to minimize the tendency to peel the second layer 18 of pressure sensitive adhesive from a substrate when the front sheet 20 is peeled from the first layer 16 of pressure sensitive adhesive.

The adhesive clip 10 can be generally rectangular or square with rounded corners as illustrated, and can have width and height dimensions both in the range of about 1 to 2 inches (e.g., 1.5 inches each). If desired, the adhesive clip 10 could be made significantly wider (e.g., 6 inches) to afford engaging a wider portion of a sheet to be supported, which may be desirable for very large sheets such as mechanical or architectural drawings.

Figure 5:
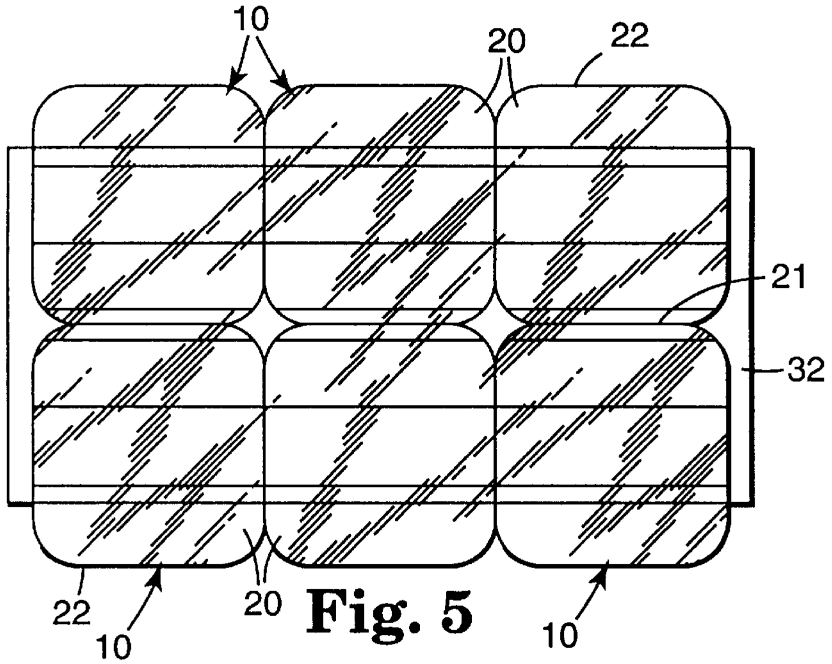
FIG. 5 is a front view of six of the adhesive clips of FIG. 1 adhered to a release liner.

FIG. 5 illustrates six of the adhesive clips 10 adhered by their second layers 18 of removable pressure sensitive adhesive to a common release liner 32. The adhesive clips 10 on the release liner 32 can be formed by conventional adhesive coating, laminating, and die cutting techniques, as will be apparent to those skilled in the art.

Figure 6:
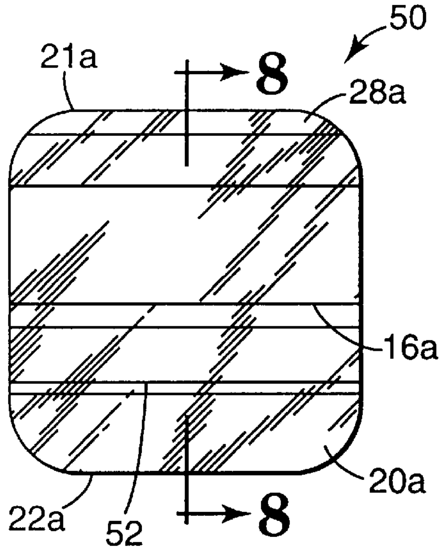
FIG. 6 is a front view of a second embodiment of an adhesive clip according to the present invention.
Figure 7:
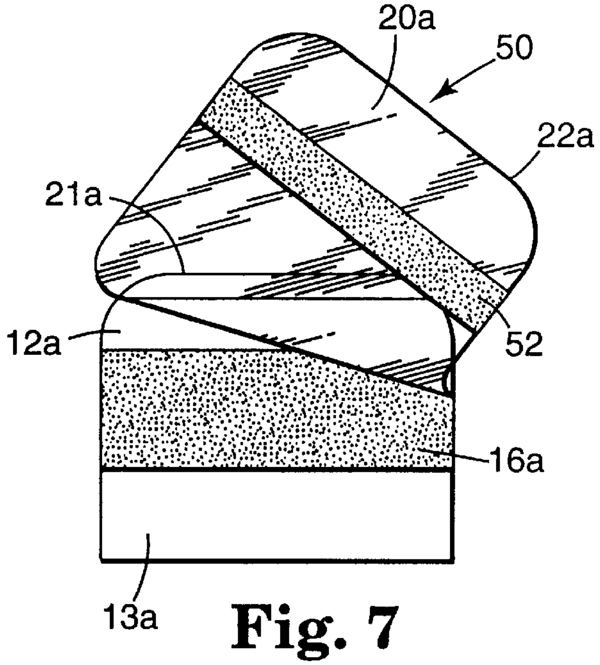
FIG. 7 is a front view of the adhesive clip of FIG. 6 in which a front sheet of the adhesive clip is lifted up to expose both a layer of removable pressure sensitive adhesive on a rear sheet of the adhesive clip and a layer of removable pressure sensitive adhesive on the rear surface of the front sheet.
Figure 8:
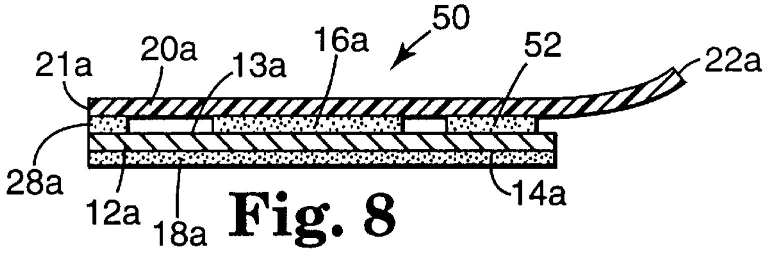
FIG. 8 is a sectional view taken approximately along line 8—8 of FIG. 6 in which the thicknesses of the various sheets and layers are exaggerated to show details.

FIGS. 6 through 8 illustrate a second embodiment of an adhesive clip generally designated by the reference numeral 50, which adhesive clip 50 includes the same structural elements as the adhesive clip 10 described above so that the same structural elements in the adhesive clip 50 are identified by the same reference numerals used above in the adhesive clip 10 to which have been added the suffix "a". Generally, the adhesive clip 50 comprises a back sheet 12*a* having opposite front and rear major surfaces 13*a* and 14*a*; a first layer 16*a* of removable pressure sensitive adhesive on its front major surface 13*a;* a second layer 18*a* of removable pressure sensitive adhesive on the rear surface 14*a* of the back sheet 12*a;* and a front sheet 20*a* of visually transparent polymeric material having first and second opposite edges 21*a* and 22*a* and having a size adapted to at least overlay the first layer 16*a* of removable pressure sensitive adhesive on the front surface 13*a;* and means in the form of an elongate adhesive strip 28*a* for attaching the first edge 21*a* of the front sheet 20*a* to the back sheet 12*a* with the front sheet 20*a* overlying the first layer 16*a* of removable pressure sensitive adhesive on the back sheet 21*a.* The adhesive clip 50 differs from the adhesive clip 10 only in that the first layer of removable pressure sensitive adhesive is moved closer to the first edge 21*a* of the front sheet 20*a,* and the adhesive clip 50 further comprises a third layer 52 of removable pressure sensitive adhesive on a surface of the front sheet 20*a* adjacent the back sheet 12*a.* The first and third layers 16*a* and 52 of removable pressure sensitive adhesive are spaced from each other so that they will not adhere together when the adhesive clip 50 is not supporting a sheet.

The third layer 52 of removable pressure sensitive adhesive on the adhesive clip 50 affords added adhesion if the adhesive clip 50 is used to support a single sheet; and also allows the adhesive clip 50 to support a document such as a calendar which includes a plurality of sheets bound along one edge. Such a document can be supported with that bound edge generally horizontal and with at least two of the sheets of the document projecting upwardly between the front and back sheets 20*a* and 12*a* of the adhesive clip 50. The layers 16*a* and 52 of adhesive on the front surface 13*a* of the back sheet 12*a* and on the surface of the front sheet 20*a* adjacent the back sheet 12*a* will adhere to the outer surfaces of the outermost two of those upwardly projecting sheets and hold those outermost two sheets (and any other sheets sandwiched between them) in the clip 50.

Figure 9:
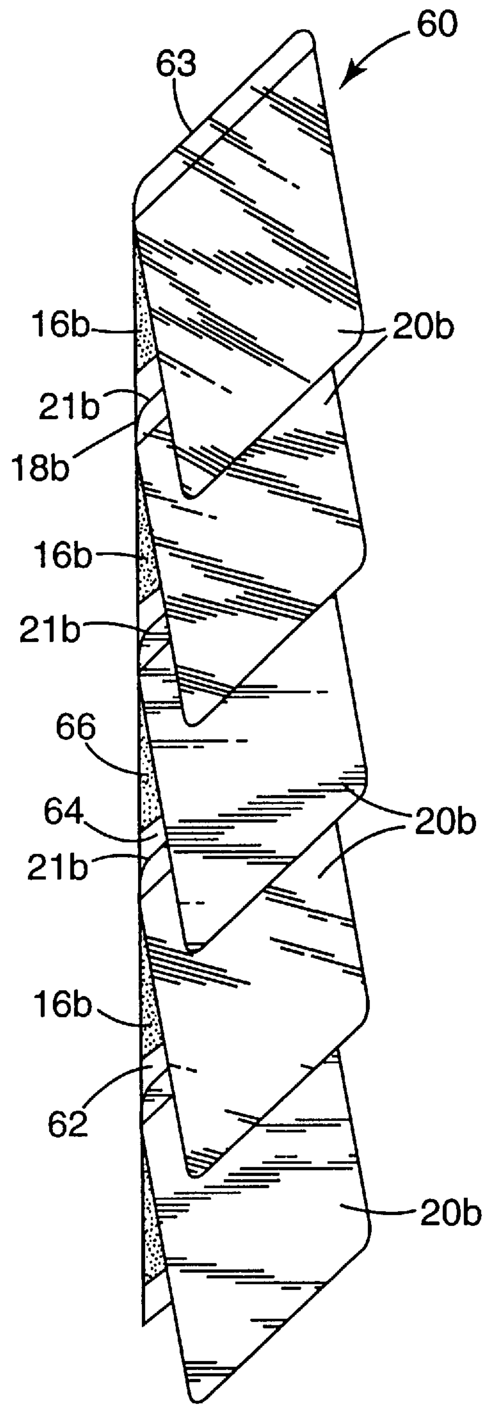
FIG. 9 is a perspective view of a third embodiment of an adhesive clip according to the present invention which is adapted to support a plurality of sheets or other light objects.

FIG. 9 illustrates a third embodiment of an adhesive clip generally designated by the reference numeral 60 which includes some of the same structure as the adhesive clip 10 described above, and in which the same structural elements are identified by the same reference numerals to which have been added the suffix "b".

The adhesive clip 60 is adapted to support a plurality of sheets in shingled relationship. A back sheet 62 of the adhesive clip 60 is elongate, and a plurality of front sheets 20*b* are attached along a front surface 64 of the back sheet 62 in spaced relationship with first edges 21*b* of the front sheets 20*b* adjacent a first end 63 of the back sheet 62 and with the front sheets 20*b* each overlying a different one of a plurality of first elongate transverse layers 16*b* of removable pressure sensitive adhesive spaced along the front surface 64 of the back sheet 62. When the back sheet 62 of the adhesive clip 60 is adhered to a planar substrate by a second layer 18*b* of pressure sensitive adhesive extending over its entire rear surface 66, any one of the front sheets 20*b* can be pivoted away from the back sheet 62 to afford supporting or removing a supported sheet as described above. As illustrated, the adhesive clip 60 can removably support five sheets, however, the clip could be made in different lengths with more or less of the front sheets 20*b* to accommodate a different number of sheets to be supported in shingled relationship.

If desired, the adhesive clip 60 could further comprise a third layer (not illustrated) of removable pressure sensitive adhesive on the surface of each of the front sheets 20*b* adjacent the back sheet 62, with the first and third layers of removable pressure sensitive adhesive then being disposed with respect to each front sheet 20*b* in the manner described and illustrated for the adhesive clip 50.

The present invention has now been described with reference to several embodiments of the adhesive clip. It will be apparent to those skilled in the art that many changes can be made in the embodiments described without departing from the scope of the present invention. For example, the means for attaching a first edge of the front sheet to the back sheet with the front sheet overlying the first layer of removable pressure sensitive adhesive on the front surface could be provided by heat fusion or a layer of single coated tape adhered to both sheets. Thus, the scope of the present invention should not be limited to the structures and methods described in this application, but only by the structures and methods described by the language of the claims and the equivalents thereof.

What is claimed is:

1. An adhesive clip adapted to be mounted on a support surface for supporting a sheet or light weight item, said adhesive clip comprising:

(a) a back sheet having opposite first and second edges and opposite front and rear major surfaces;

(b) a first layer of removable pressure sensitive adhesive covering at least a portion of said back sheet front surface;

(c) a second layer of removable pressure sensitive adhesive on said back sheet rear surface adapted for bonding with the support surface; and (d) a front sheet having opposite first and second side edges, the first side of said front sheet is pivotally connected with the first edge of said back sheet and overlays at least a portion of the item supported by the adhesive clip, said front sheet being movable between a closed position wherein said front sheet overlays said first layer of removable pressure sensitive adhesive, and an open position wherein said front sheet is positioned at an angle relative to said back sheet, said front sheet including manual gripping means at the second edge, which, when said front sheet is in said closed position, extends beyond both said first layer of removable pressure sensitive adhesive and the second edge of said back sheet.

2. An adhesive clip as defined in claim 1, wherein said first layer of removable pressure sensitive adhesive is arranged on said back sheet front surface as an elongated strip spaced from and extending generally parallel to said back sheet first and second edges.

3. An adhesive clip as defined in claim 2, wherein said pivotal connection comprises an elongate strip of hinge tape, said elongate strip of hinge tape including a backing having opposite major surfaces, a layer of pressure sensitive adhesive on both of said major surfaces, and opposite longitudinally extending edges, the layer of pressure sensitive adhesive on one of said hinge tape major surfaces being adhered to said front sheet adjacent said first edge, and the layer of pressure sensitive adhesive on the other of said hinge tape major surfaces being adhered to said back sheet front surface adjacent said first edge.

4. An adhesive clip as defined in claim 3, and further including a third layer of removable pressure sensitive adhesive arranged on said front sheet adjacent said gripping means for engagement with said back sheet front surface.

5. An adhesive clip as defined in claim 4, wherein said front sheet is formed of a visually transparent polymeric material.

6. An adhesive clip as defined in claim 5, wherein said front sheet is flexible and generally rectangular with a width dimension and a height dimension each in the range of about 1 to 2 inches, and wherein said front sheet gripping means extends at least one half inch beyond both said first layer of removable pressure sensitive adhesive opposite said front sheet first edge and the second edge of the back sheet.

7. An adhesive clip as defined in claim 6, wherein both said back sheet and said front sheet are flexible with said front sheet being of stiffer material than said back sheet.

8. An adhesive clip as defined in claim 1, wherein said front sheet is adhesively bonded with said back sheet.

* * * * *